Aug. 23, 1966 R. H. BOSWORTH 3,268,186

HOT GAS PROPORTIONAL CONTROL VALVE SYSTEM

Original Filed March 12, 1964 8 Sheets-Sheet 1

INVENTOR.
ROBERT H. BOSWORTH
BY
Constantine A. Michalos
ATTORNEY

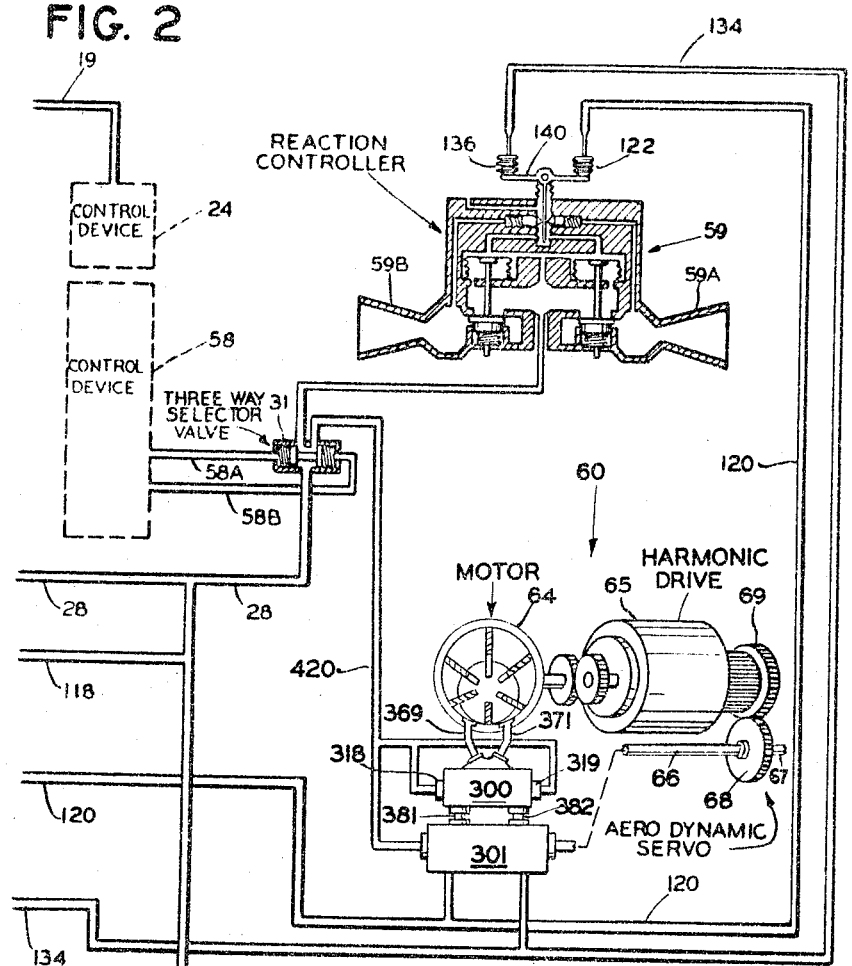
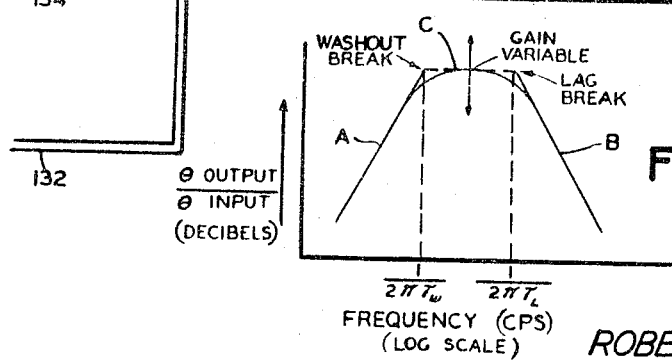

INVENTOR.
ROBERT H. BOSWORTH

Aug. 23, 1966  R. H. BOSWORTH  3,268,186
HOT GAS PROPORTIONAL CONTROL VALVE SYSTEM
Original Filed March 12, 1964  8 Sheets-Sheet 4

INVENTOR.
ROBERT H. BOSWORTH
BY
Constantine A. Michalos
ATTORNEY

Aug. 23, 1966  R. H. BOSWORTH  3,268,186
HOT GAS PROPORTIONAL CONTROL VALVE SYSTEM
Original Filed March 12, 1964  8 Sheets-Sheet 5
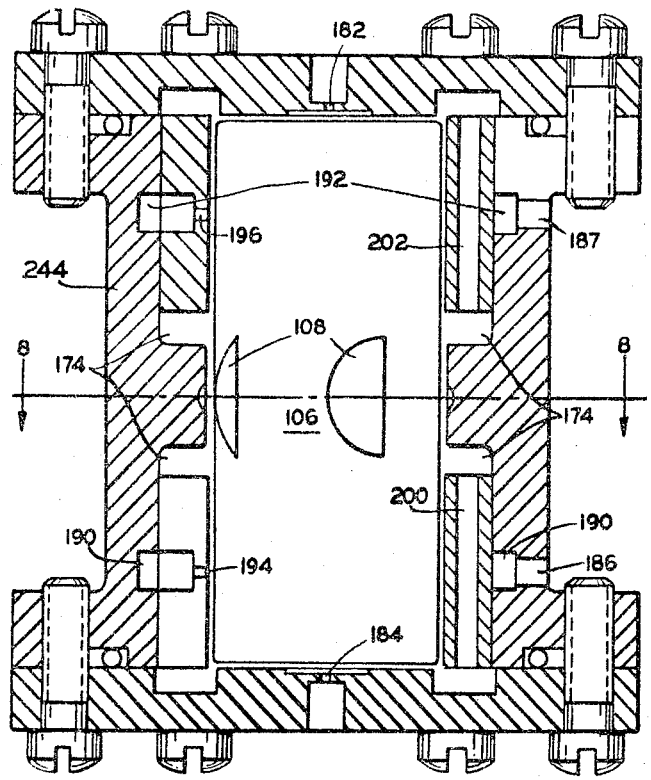
FIG. 7
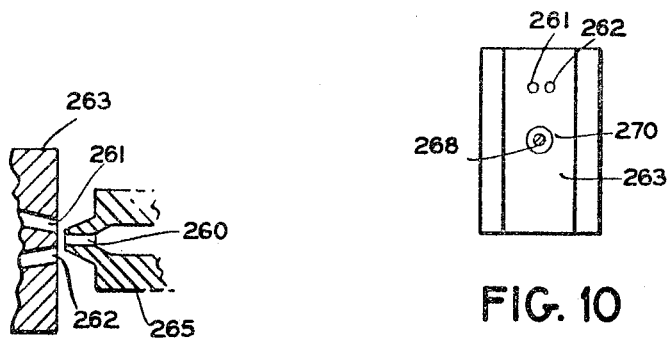
FIG. 9
FIG. 10
INVENTOR.
ROBERT H. BOSWORTH
BY
Constantine A. Michalos
ATTORNEY INVENTOR.
ROBERT H. BOSWORTH
BY
Constantine A. Michalos
ATTORNEY Aug. 23, 1966  R. H. BOSWORTH  3,268,186
HOT GAS PROPORTIONAL CONTROL VALVE SYSTEM
Original Filed March 12, 1964  8 Sheets-Sheet 7

INVENTOR.
ROBERT H. BOSWORTH
BY
Constantine A. Michalos
ATTORNEY

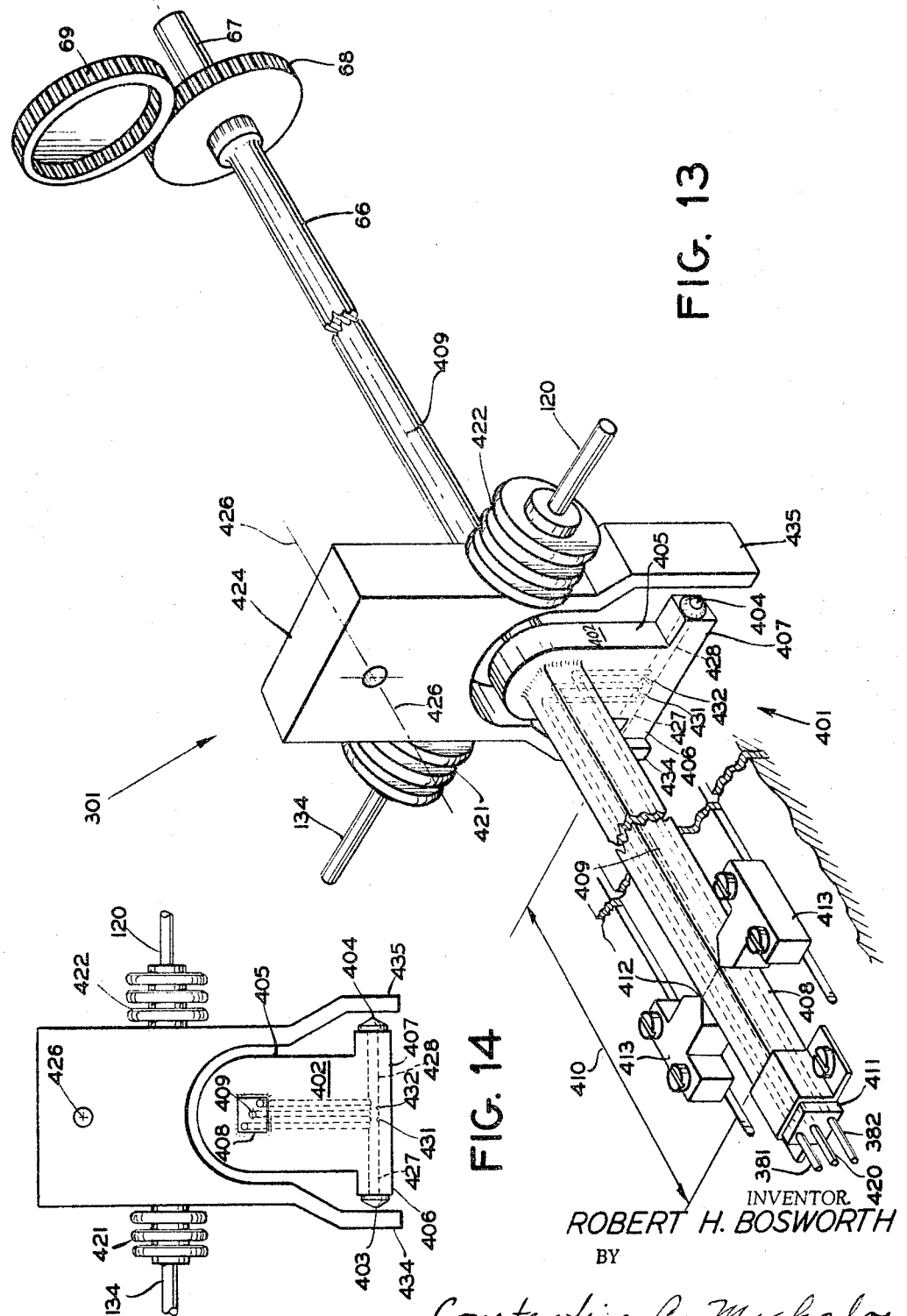

United States Patent Office 3,268,186
Patented August 23, 1966

3,268,186
HOT GAS PROPORTIONAL CONTROL
VALVE SYSTEM
Robert H. Bosworth, Morristown, N.J., assignor to The
Bendix Corporation, a corporation of Delaware
Original application Mar. 12, 1964, Ser. No. 351,367, now
Patent No. 3,223,364, dated Dec. 14, 1965. Divided
and this application Feb. 15, 1965, Ser. No. 432,800
2 Claims. (Cl. 244—78)

This is a division of application Serial No. 351,367, filed March 12, 1964, now Patent No. 3,223,364, December 14, 1965.

The present invention relates generally to fluid pressure operated networks and signal amplification means together as a compensating mechanism for use in a hot gas flight stabilization system having a rate gyroscope, and particularly to a hot gas system having a sensing means, a servo motor for a control surface and a proportional flow control valve utilizing differential pressure as a control source, in the fluid pressure operated network signal amplification system such as a system having pressurized gas for the energy supply, to provide controlling signals to a power using device such as a vane motor to drive the control surfaces of any vessel or vehicle such as a ship or an aircraft or outer space vehicle.

The fluid systems of the copending applications, herein cited, provide a proportional control valve to perform the function of supplying signals to a power device, such as a motor, to drive the aerodynamic surface of an aircraft or outer space vehicle. This valve employs bellows in such a way as to produce axial and curved motion to the bellows. The dual motion required of the bellows induces squirming and early failure of the bellows. This valve also necessitates the use of two flexural pivots. These pivots caused an additional problem in that they failed occasionally, probably due to the forces produced by the signal bellows.

In a proportional control valve system to which this invention is directed, a supply of pressurized hot gas is provided from a fuel tank. The valve is controlled by a differential pressure output signal from a control mechanism as herein more fully explained. Through the differential pressure control, the valve provides a controlled output of the pressurized hot gas into a rotary expansion type motor which drives the mechanism to position the aerodynamic control surfaces of the aircraft or space vehicle.

In the present invention, the energizing and signal medium utilized may be a pressurized cold gas such as bottled air under high pressure or hydrogen gas under high pressure or a hot gas such as a hydrazine or decomposition products of ninety percent (90%) hydrogen peroxide which may be supplied at approximately 1400° F. and 600 p.s.i. to the rate gyroscope and signal generating means for use in a pressurized gas flight stabilization system applicable to aircraft and outer space vehicles.

Such fluid pressure operated systems, utilizing hot and cold gases, find increasing application in the control of missiles and spacecraft. Extensive studies in hot gas controls have led to the development of techniques that provide unprecedented degrees of mission reliability in aerodynamic surface actuation, space orientation and stabilization, power generation and utilization, and conversion devices.

Hot gas controls by the very nature of the fluid media employed are unaffected by environment; however, the materials of which hot gas devices are constructed pose their greatest limitation. These limitations are overcome through the use of all facets of gas technology—high temperature materials; fuels compatible with auto-oxidation to avoid the limitations of conventional lubricants, the use of gas expansion principles to allow survival of conventional lubricants, and finally a thermal balance between mission environment, duration and material heat sink properties.

Power application techniques involve multiple-power conversions, with attendant complexity and inefficiency. Hot gas provides a method whereby the energy released by fuel or propellant is used in a single conversion to provide horsepower. The equipment, with the exception of the fuel itself, requires no cooling or shielding, thereby making the general techniques independent of complex artificial environments.

The system's simplicity, reliability, and flexibility offer the vehicle manufacturer broad attitudes of application. Some of the many possibilities of the system are as follows:

(1) Combining the control with an Accessory Power Unit,
(2) Selecting fuels capable of multiple functions, as hydrogen-oxygen (breathing, electrical power, control power, main propulsion cooling—as examples).

Additional flexibility is gained by utilizing main engine propellants or main engine gas products.

Also worthy of consideration in evaluating Gas Controls are:

(1) The elimination of return lines (as compared to hydraulics),
(2) A dry system,
(3) A high degree of storability,
(4) A single power source for atmospheric and space control.

Although hot gas represents a means of providing control actuation and space-attitude control, work is in progress to expand the sphere to other flight-control functions. The concepts under development and designs already available will provide a total control capability, with each individual system combination utilizing the best that the entire control field has to offer.

An object of this invention is to provide a novel proportional flow control valve utilizing differential pressure as a control source for directing supply pressure to a power using device that positions aerodynamic control surfaces of an aircraft or outerspace vehicle.

Another object of this invention is to provide a proportional flow control valve that is so constructed that it may be simply attached to a gas pressure operated rate gyroscope system wherein the gyroscope is energized solely by pressurized gases such as utilized in flight stabilization of aircraft and outerspace vehicles subject to high temperature environments.

A further object of this invention is to provide a proportional flow control valve that utilizes a source of high temperature gas in the range of 1400° F. and a pressure in the range of 600 p.s.i.g.

An additional object of this invention is to provide a proportional flow control valve having a differential pressure signal applied to control bellows and wherein the valve provides for means of supporting the bellows against dual motion inducing squirming and early failure.

Still another object of this invention is to provide an improved feedback signal and positioning device for an all-mechanical and pneumatic or fluid system.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:
FIGURE 1 is a diagrammatic view of a part of a hot gas flight stabilization system in which there is shown in operative relation one form of hot gas driven rate gyroscope embodying the subject matter of the invention;

FIGURE 2 is a diagrammatic view of a second part of the hot gas flight stabilization system of FIGURE 1;

FIGURE 3 is a magnitude ratio diagram illustrating graphically the relationship between the input frequency of the controlling signal and the output gain effected by the control mechanism of FIGURE 1 in the low frequency, intermediate frequency and high frequency signal operating ranges;

FIGURE 7 is an enlarged sectional view of the rotor case and turbine of FIGURE 5 taken along the lines 7—7;

FIGURE 9 is an enlarged fragmentary sectional view of the control jet pipe nozzle, jet pipe receiver orifices and control block taken along the lines 9—9 of FIGURE 5;

FIGURE 10 is a fragmentary end view of the control block taken along the lines 10—10 of FIGURE 5 showing the jet pipe receiver orifices and stop pin in operative relation;

FIGURE 13 shows a perspective schematic view of an input signal and position feedback assembly.

FIGURE 14 shows a flapper valve assembly which cooperates with the proportional control valve for repositioning the control surfaces of the stabilization system.

Figure 1:
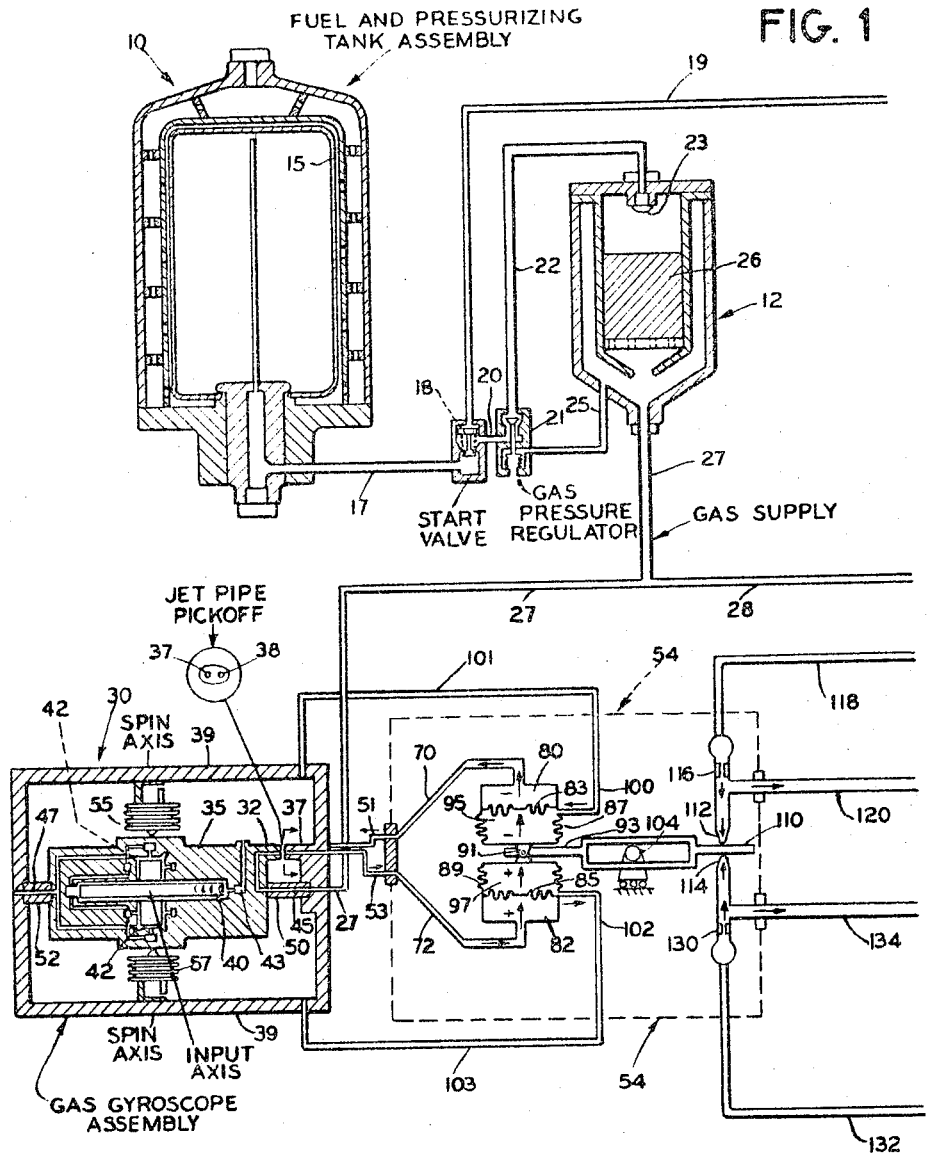

Referring to the drawings of FIGURES 1 and 2, there is shown a hot gas stabilization system including a container or fuel tank 10 in which the fuel pressure may be allowed to decay during the duty cycle, but in which the generated gas pressure may be maintained at a constant level, for example 600 ± p.s.i.g., by metering the flow of liquid fuel to a gas generator and accumulator assembly 12.

The fuel tank 10 may be of a conventional type including an expulsion bladder 15 containing a suitable fuel such as hydrogen peroxide. The tank 10 may be pressurized by a suitable gas such as nitrogen gas to an initial pressure of 1,800 p.s.i.g. The liquid hydrogen peroxide contained in the bladder 15 may then be applied under the pressure of the nitrogen gas in the container 10 to an output line or conduit 17 controlled by a start valve 18 operated through a control conduit 19. Upon the start valve 18 being opened, the liquid hydrogen peroxide under the pressure of the nitrogen gas will then flow through a conduit 20 and a gas pressure regulator or peroxide metering valve 21 to a conduit 22 leading to the inlet 23 of the gas generator 12.

The start valve 18 may operate in response to an external command signal or fluid pressure applied through the conduit 19 from an outside source or suitable control device 24. The gas pressure regulator 21 will control the amount of hydrogen peroxide flowing through conduit 22 into the gas generator 12 in response to the controlling gas outlet pressure from the gas generator and accumulator assembly 12 applied through a conduit 25.

The liquid hydrogen peroxide applied to the gas generator 12 may be decomposed in a silver screen catalyst bed 26 into oxygen and superheated steam having a temperature of approximately 1400° F. The decomposed hydrogen peroxide then flows through an output gas supply line or conduit 27 from the generator and accumulator assembly 12 to a rate gyroscope assembly 30 and through an output line or conduit 28 to a three-way selector valve 31, as hereinafter described.

The output line 27 connected to the rate gyroscope 30 opens at a control jet pipe nozzle 32 attached to a gimbal provided by a rotor housing or enclosure 35 of the rate gyroscope 30 and operatively positioned in relation to two (2) jet pipe receiver orifices 37 and 38 projecting from an interior surface of a sealed casing 39 of the rate gyroscope 30.

The jet pipe nozzle 32 and receiver orifices 37 and 38 may be of a conventional type such as shown, for example, by U.S. Patent No. 2,345,169, granted March 28, 1944, to G. Wunsch et al.

The gyro assembly 30 is an all-gas pressure operated rate gyroscope which may operate under extremely high temperaurte conditions without any energy source other than the supply gas and may be of a type disclosed in greater detail and claimed in a U.S. application Serial No. 189,144, filed April 20, 1962, by George M. Thomson and James S. Malcolm, and assigned to The Bendix Corporation. Hot gas flight stabilization systems of the aforenoted type are applicable to any type of vehicle including space vehicles subject to high temperature operating environments.

Figure 4:
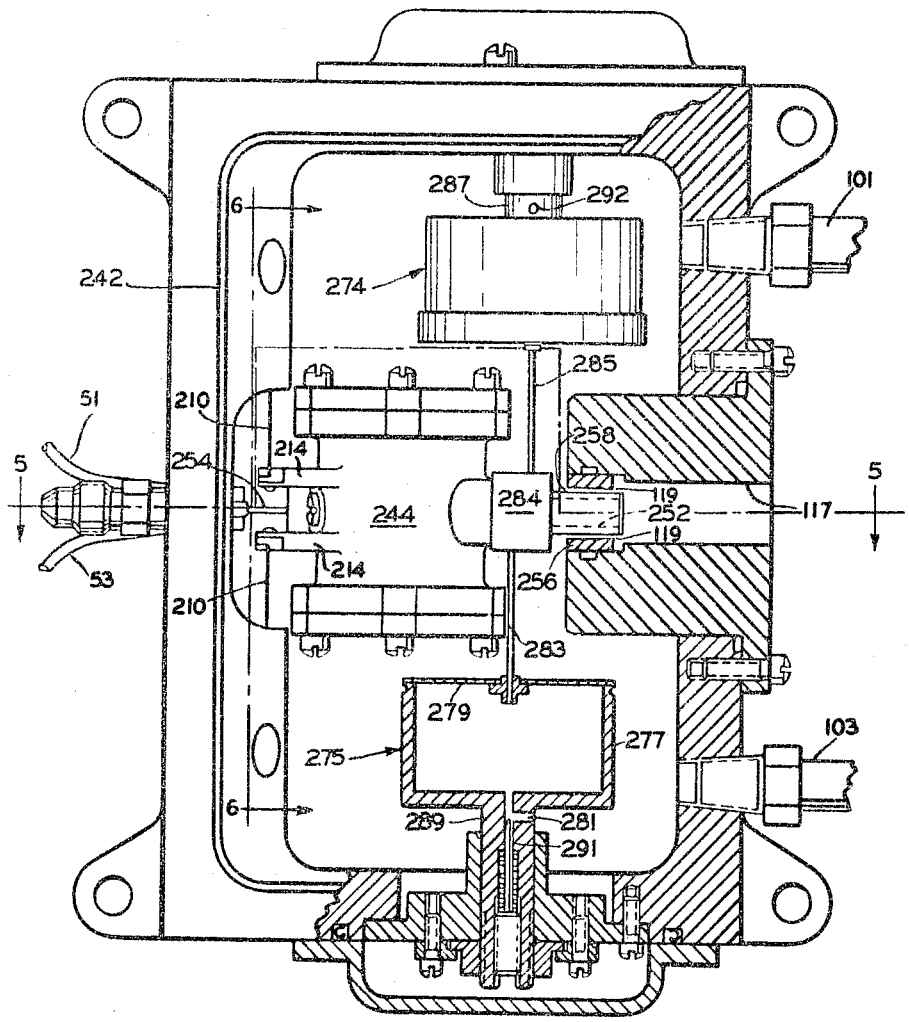
FIGURE 4 is a side sectional view of a second form of pressurized gas driven rate gyroscope embodying the subject matter of the invention.
Figure 5:
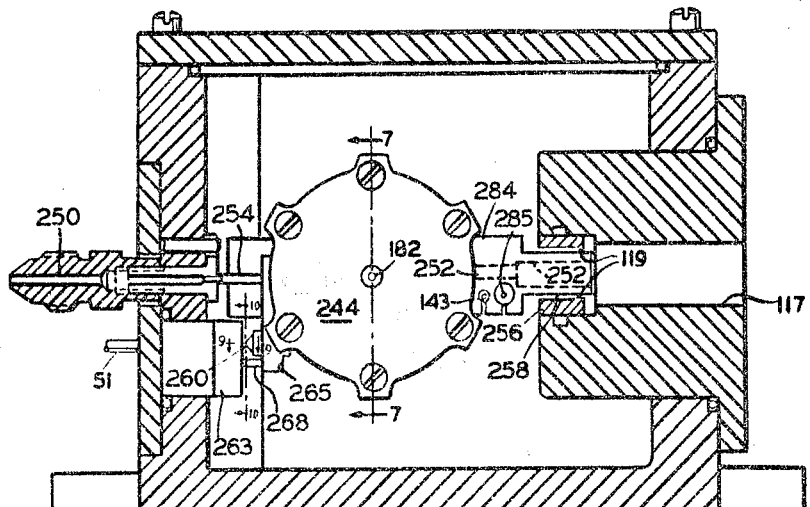
FIGURE 5 is a top sectional view of the rate gyroscope of FIGURE 4 taken along the lines 5—5.

The gyroscope assembly 30 may include a turbine driven gyroscope rotor wheel 40 which rotates on gas bearings 42, as shown in FIGURE 1, and which may be mounted in the housing 35. The housing 35 has an inlet passage or connection 45 and an outlet passage or connection 47 extending through torsion tubes 50 and 52, which tubes act as the spring restraint for the rotor housing or enclosure 35 and may be of conventional type. (An alternate design may utilize one hollow torsion tube and one hollow pivot suspended on a gas bearing, as illustrated by FIGURES 4 and 5.) The gimbal motion of the rotor housing 35 is indicated by the jet pipe nozzle 32 projecting from the housing 35 and the position thereof relative to the two (2)) jet pipe receiver orifices 37 and 38 projecting from the interior surface of the casing 39. Gimbal motion of the rotor housing 35 is damped by two (2) opposing bellows-orifice combinations 55 and 57. The entire mechanism is contained in the sealed casing 39 with the inlet connection 45 and the exhaust connection 47 for the energizing gas and output signal conduits 51 and 53 leading from the jet pipe receiver orifices 37 and 38, respectively, to a compensated control mechanism 54.

The invention relates to improvements in a gas pressure operated rate gyroscope system in which the control mechanism 54 may be of a type disclosed in greater detail and claimed in a copending U.S. application Serial No. 186,252 filed April 9, 1962 by Edward Jeye, Robert Bosworth, Ben C. Nichols, and Raymond Kaczyinski and assigned to The Bendix Corporation.

In the operation of the hot gas rate gyroscope 30, shown in FIGURE 1, hydrogen peroxide gas, under pressure, is applied through conduit 27 through inlet passage 45 into the torsion tube 50 and out of the jet pipe nozzle 32 projecting from the rotor housing 35. Any motion of housing 35 is detected by means of the differential pressure effected between the two jet pipe receiver orifices 37 and 38 by the adjusted position of the jet pipe nozzle 32 in relation thereto. The gas is then accumulated under pressure in the sealed casing 39 and directed into the turbine or gyroscope rotor wheel 40 and gas bearing 42 cavities through a passage 43, so as to rotate the gyroscope rotor wheel 40 and provide gas to the gas bearings 42 on which the rotor wheel 40 is suspended.

The rotation of the gyroscope rotor wheel 40 effects an angular momentum about the spin axis of the gyroscope rotor which, in turn, creates a gyroscopic torque about its output axis when an angular velocity is applied about its input axis. This torque produces gimbal motion about its output axis which is restrained by the torsion tube or tubes 50 and 52 and is indicated by the adjusted position of the jet pipe nozzle 32 relative to the receiver orifices 37 and 38, as previously described.

Undesirable oscillatory motions of the gimbal or rotor housing 35, as outlined before, are damped by the two (2) opposing bellows-orifice combinations 55 and 57 acting between the gimbal or rotor housing 35 and the casing 39. This is accomplished by one of the bellows, for example 55, compressing a volume of the gas and exhaling it through an orifice while the other bellows, for example 57, expands a volume of gas and inhales it through an orifice. Each of the bellows 55 and 57 alternately expands and compresses the gas in one complete cycle.

The three-way valve 31, as shown in FIGURE 2, may be operable by a command or fluid pressure signal from a suitable control device 58 applied through conduits 58A and 58B so as to selectively render operative a jet reaction controller 59 or an aerodynamic servo 60. Thus, the operation of the three-way valve 31 may be for the operator to select the mechanism to be effective in controlling the aircraft or outer space vehicle by applying a flow of controlling hot gas so as to operate the appropriate controller 59 or 60.

The gas driven rate gyroscope 30, as heretofore explained, includes the rotor wheel 40 which spins on the gas bearings 42 at extremely high rates of speed, for example, 120,000 r.p.m., so as to provide a necessary flight orientation (single axis) signal to the compensated control mechanism 54. The control mechanism 54 includes, as hereinafter more fully described, a flapper servo valve amplifier and a filter arrangement which may filter or "wash out" the low frequency steady-state rate signals associated with a turn maneuver of the aircraft or outer space vehicle.

The output of the compensated control mechanism 54 provides a differential pressure output signal which is applied so as to control the reaction controller 59 and the aerodynamic servo 60, as hereinafter described.

The jet reaction controller 59 may include an automatic proportional type of gas metered thrust chamber and two opposed nozzles 59A and 59B so arranged that each chamber may produce a thrust of, for example, one hundred pounds.

The aerodynamic surface controller 60 includes a proportional control valve 300 and an input signal and position feedback assembly 301 utilizing the differential pressure provided by the compensated control mechanism 54 as a control source. The output of the valve 300 is applied to a rotary expansion vane type motor 64 which drives a mechanical transmission such as a harmonic drive 65. This transmission 65 is mechanically connected through gears 68 and 69 by an arm or position feedback linkage 66 and another linkage 67 to aerodynamic control surfaces, not shown, of the vessel, aircraft, or outer space vehicle. The position feedback assembly 301 repositions the valve 300 with the changes in the position of the linkage 67 and the aerodynamic control surfaces, not shown. The proportional control valve 300 and the input signal and position feedback assembly 301 are described in greater detail hereinafter.

As shown schematically in FIGURE 1, the output conduits 51 and 53 lead from the jet pipe receiver orifices 37 and 38, respectively, to input lines or conduits 70 and 72 of the control mechanism 54 which are in turn connected to dead-ended chambers 80 and 82 of identical structure and having rigid walls except for walls defined by flexible diaphragms 83 and 85, respectively.

The diaphragms 83 and 85 separate the dead-ended chambers 80 and 82 from the interior of flexible bellows 87 and 89 arranged in balanced relation and operatively connected at 91 to lever arm 93.

The bellows 87 and 89 provide interiorly thereof variable volumes 95 and 97, respectively, and opening into the interiors of the bellows 87 and 89, are capillary tubes 100 and 102 leading to and from the interior of the sealed casing 39 of the gyro 30 so as to connect to the interior of the bellows 87 and 89 a substantially constant pressure source of hot gaseous fluid pressure medium applied through conduits 101 and 103 connected to the interior of the sealed casing 39 of the gyroscope 30.

As shown schematically in FIGURE 1, the lever arm 93 of the control mechanism 54 is pivotally mounted on a fulcrum 104 which may be adjustably positioned in a suitable manner by the operator to provide various selected mechanical advantages. The lever arm 93 is adjustably positioned about the fulcrum 104 so as to control the position of a flapper valve 110 relative to suitable fluid pressure valve orifices 112 and 114 to cause a pressure change to occur in the chamber between the valve orifice 112 and a restricted orifice 116 leading through a conduit 118 to the source of fluid pressure medium applied through conduit 28. The change in the differential pressure applied in the chamber between the valve orifice 112 and the restricted orifice 116 is in turn applied through a conduit or output line 120 to a suitable bellows 122 to effect a control function, as shown diagrammatically in the system of FIGURE 1.

The adjustment of the flapper valve 110 relative to the valve orifice 112 will effect in an opposite sense the valve orifice 114 to cause in turn a pressure change in an opposite sense in the chamber between the valve orifice 114 and a restricted orifice 130 leading through conduit 132 to the source of fluid pressure medium applied through conduit 28. The change in the differential pressure applied in the chamber between the valve orifice 114 and the restricted orifice 130 is in turn applied through a conduit or output line 134 to a suitable bellows 136 so as to act with the bellows 122 to control the position of a pivotal control arm 140 to effectively control the jet reaction controller 59. Similarly, the differential pressure signals applied through the output lines 120 and 134 of the control mechanism 54 are effective to control the input signal and position feedback assembly 301 and the proportional control valve 300 of the aerodynamic servo 60 for positioning aerodynamic surfaces of the aircraft or outer space vehicle, as herein more fully described, as well as the jet reaction controller 59 for controlling the attitude of the aircraft or outer space vehicle.

In the operation of the control mechanism 54, upon a differential pressure signal being applied through output conduits 51 and 53 of the rate gyroscope 30 by the displacement of the position of the jet pipe nozzle 32 relative to the receiver orifices 37 and 38, this differential pressure signal will cause a change in the volume of chambers 80 and 82 due to the resulting deflection in opposite senses of diaphragms 83 and 85. The resulting displacement of the diaphragms 83 and 85 will in turn then cause a change in the volumes 95 and 97 of the bellows 87 and 89, respectively, which in turn will act through the fluid gaseous medium within the bellows 87 and 89 to effect a displacement of the bellows 87 and 89 in opposite senses and a resulting displacement thereby of the lever arm 93 to cause in turn the flapper valve 110 to be so adjusted relative to the valve orifices 112 and 114 as to effect through the flapper valve controlled system an adjustment of the control arm 140 of the reaction controller 59 and the position feedback assembly 301 with the proportional control valve 300 of the aerodynamic servo 60 to provide the desired control function.

The respective changes in opposite senses in the pressure of the fluid medium in the volumes 95 and 97 will also cause a restricted flow of fluid medium through the capillary tube 100 in one sense and a restricted flow of fluid medium through the capillary tube 102 in an opposite sense until a steady-state condition has been effected. The resulting adjustment of the lever arm 93 and flapper valve 110 will in turn cause a differential pressure change in the flapper system and differential pressure signal applied to the output lines 120 and 134 to control suitable mechanism on the aircraft or outer space vehicle such as the aerodynamic servo 60 or gas reaction controller 59 for controlling the flight attitude of the aircraft or vehicle in outer space.

In the operation of the system of FIGURES 1 and 2, it will be seen that the control mechanism 54 includes a fluid pressure operated network and signal amplification means, which when utilized in the fluid pressure operated flight stabilization system of FIGURES 1 and 2 will perform two required system functions; to wit, the mechanism 54 will filter or "wash out" steady-state rate signals associated with a flight turn maneuver of an aircraft or outer space vehicle (low frequency signals) as indicated graphically in FIGURE 3 by the line A and attenuate rate signals arising from structural coupling of the body of the aircraft or outer space vehicle with the rate gyroscope 30 (high frequency signals) as indicated graphically in FIGURE 3 by the line B, while providing high gain output signals in response to input signals applied over a normal intermediate operating range (intermediate frequency signals) as indicated graphically in FIGURE 3 by the line C.

The frictional resistance of the input lines 70 and 72, as well as the capillary lines 100 and 102, together with the flexibility of the diaphragms 83 and 85 and bellows 87 and 89 and the compressibility of the fluid medium in the volumes 95 and 97 under the pressure of the fluid medium applied through the capillary lines 100 and 102 and subject to the changing pressure of the fluid medium applied to the diaphragms 83 and 85 in response to an input signal is such that upon a change in the input signal at the relatively low frequency indicated graphically by the line A of FIGURE 3, the leakage afforded by the capillary tubes 100 and 102 to the changing pressure in the volumes 95 and 97 is such as to tend to "wash out" or retard the transfer of the low frequency signals to the lever arm 93. Thus, such low frequency signals have little or no controlling effect on the flapper system so that steady-state rate signals associated with a flight turn maneuver of the aircraft or outer space vehicle or low frequency signals due to poor gyroscope nulls may be effectively eliminated, filtered or washed out.

Moreover, higher frequency signals indicated graphically by the lines C and B of FIGURE 3 are not filtered or "washed out" by the action of the capillary lines 100 and 102, but instead such higher frequency signals are transferred through the diaphragms 83 and 85, pressure medium in the volumes 95 and 97, and bellows 87 and 89 to the lever arm 93.

Furthermore, such signals within the intermediate frequency range indicated graphically by the line C of FIGURE 3 are amplified by the flapper system so as to provide high gain output control signals, while such higher frequency signals coming within the high frequency range indicated graphically by the line B of FIGURE 3 are effectively attenuated. In effecting the latter attenuation, the area of the flapper valve 110 in cooperative relation with the valve orifices 112 and 114 and the frictional resistance of the lines 120 and 134 together with the volume of the controlled bellows 122 and 136 is such that the response thereof to the rapidly changing input signal progressively decreases with an increase in the frequency of such high frequency signals over the range indicated graphically by the line B of FIGURE 3, so as to thereby effectively attenuate and eliminate those extremely high frequency rate signals arising from structural coupling of the body of the aircraft or outer space vehicle.

A second form of the gas pressure operated rate gyroscope 30 of FIGURE 1, is shown in FIGURES 4 and 5 in which corresponding parts are indicated by like numerals. In the second form of the rate gyroscope there may be provided a sealed casing 242 and pivotally mounted in the sealed casing 242 a rotor housing 244.

Figure 8:
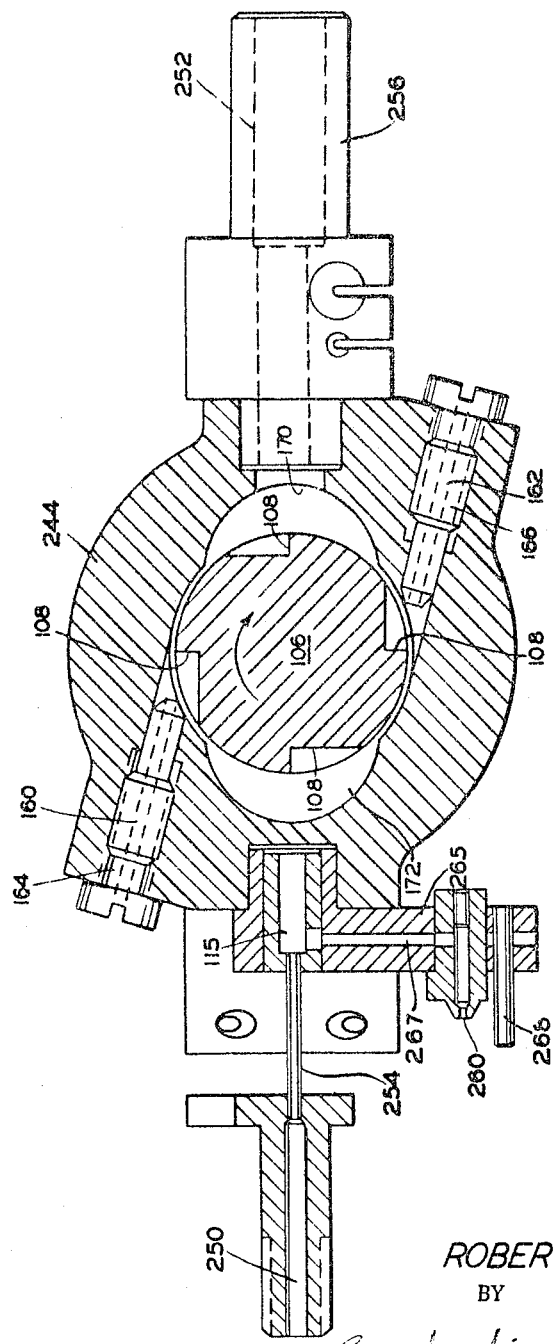
FIGURE 8 is a sectional view of the rotor case and turbine taken along the lines 8—8 of FIGURE 7.

There is further provided, as shown in detail in FIGURES 7 and 8, a gas pressure driven turbine 106 having buckets 108 and rotatably mounted on gas bearings, as shown in FIGURE 7. The rotor housing 244, as shown in FIGURE 8, has an inlet passage 250 for a gaseous pressure medium and an outlet passage 252.

The inlet passage 250 opens into one end of a hollow flexible torsion tube 254, the other end of which opens into a passage 115 in the rotor housing 244, as shown in FIGURE 8. The torsion tube 254 acts as a spring in restraint of angular movement of the rotor housing 244 about the axis of tube 254 and a bearing member 256. The gaseous pressure medium may be supplied to the inlet passage 250 by the gas supply line 27, as shown diagrammatically by FIGURE 1. The outlet passage 252 may extend through the bearing member 256 and exhausts through a channel 117 to atmosphere, as shown in FIGURE 4. The bearing member 256 is mounted in a gas bearing 258 and has a restricted portion 119 which permits the pressurized gaseous medium within the interior of the casing 242 and applied to the gas bearing 258 to leak past such restricted portion and to in turn be exhausted to the atmosphere through the channel 117.

Angular motion of the rotor housing 244 about the axis of the tube 254 effects an angular adjustment of a jet pipe nozzle 260 shown in FIGURES 5, 8, and 9, and projecting from the rotor housing 244. The nozzle 260 may be thereby adjustably positioned relative to two (2) jet pipe receiver orifices 261 and 262, shown in FIGURES 9 and 10, opening from an opposite face surface of a control block 263 positioned in slightly spaced relation to the nozzle 260. The jet pipe nozzle 260 and receiver orifices 261 and 262 may be of a conventional type such as shown, for example, by U.S. Patent No. 2,345,169, granted March 28, 1944 to G. Wunsch et al. and may be operably connected to suitable output signal conduits 51 and 53, shown in FIGURE 4 and indicated diagrammatically in FIGURE 1.

The jet pipe nozzle 260 may be mounted on an arm 265, as shown in FIGURES 5 and 8, projecting from the rotor housing 244. A passage 267 leads through the arm 265 to the nozzle 260 from the gaseous pressure inlet passage 250, as best shown in FIGURE 8. The arm 265 carries a pin 268 which projects into an oversized hole 270 in the control block 263, shown in FIGURE 10, and is so arranged as to engage an edge defining the oversized hole 270 in the control block 263 to limit movement of the arm 265 and thereby limit the movement of nozzle 260 relative to the two (2) jet pipe receiver orifices 261 and 262 within a predetermined operative range.

As shown in FIGURE 5, the jet pipe nozzle 260 is spaced slightly from the opposite face surface of the control block 263 so as to provide, for example, a .001 inch gap therebetween permitting that portion of the gaseous pressure medium from the jet pipe nozzle 260, which is not received in either orifice 271 or 262, to exhaust into the interior of the sealed casing 242 so as to provide a pressurizing gaseous medium therein.

Oscillatory motion of the rotor housing 244 about the torsion tube 254 and gas bearing 256–258 is damped by two (2) opposing diaphragm assemblies 274 and 275 of identical construction. The diaphragm assembly 275, as shown in detail in FIGURE 4, may include a cup shaped member 277 having an end thereof sealed by a flexible diaphragm 279 while the interior of the cup shaped member 277 opens through a restricted passage 281 to the pressurized gaseous medium within the sealed casing 242.

The diaphragm 279 is operatively connected through a flexible rod 283 to a flange 284 formed integral with the bearing member 256. The diaphragm assembly 274 is similarly constructed and is operatively connected through a flexible rod 285 to the flange 284 at the opposite side thereof.

The cup shaped member of the diaphragm assembly 274 is connected by a post 287 to the interior surface of the casing 242 while the cup shaped member 277 of the diaphragm assembly 275 is similarly connected by a post 289 to the interior surface of the casing 242 at the opposite side of the flange 284 from the diaphragm assembly 275. The passage 281, as shown in FIGURE 4, is restricted by an adjustable pin 291 projecting through the post 289 and screw threadably engaged therein, as shown in FIGURE 4. The diaphragm assembly 274 has a similar adjustable pin, not shown, for restricting a passage 192 in the post 287 connecting the interior of the cup shaped member of the diaphragm assembly 274 to the gaseous pressure medium within the sealed casing 242.

Undesirable oscillatory movements of the rotor housing 244 are damped by the action of the two (2) opposed diaphragm assemblies 274 and 275 acting between the flange 284 of the bearing 256 and the casing 242. This is accomplished by one of the diaphragms of the diaphragm assemblies 274 and 275, for example, diaphragm 279 pressing the volume of the gaseous medium in the interior of the cup shaped member 277 and exhaling it through the restricted passage 281 into the interior of the pressurized casing 242 while the diaphragm of the other assembly 274, for example, expands the volume of gas within the interior of the cup shaped member thereof and inhales additional fluid pressure medium through the restricted passage 292. Each of the diaphragms of the diaphragm assemblies 274 and 275 may alternately expand and compress the gaseous medium in the interior thereof in one complete cycle of operation to effectively damp desirable oscillatory motions of the gimbal or rotor housing 244.

Further, as shown in FIGURE 8, passages 160 and 162 extend longitudinally in screws 164 and 166 angularly positioned in the rotor housing 244 at opposite sides thereof. The screws 164 and 166 are screw threadably engaged in the rotor housing 244 and the passages 160 and 162 extend from the outer ends of the screws 164 and 166 into the interior of the rotor housing 244 so that the pressurized gaseous medium within the interior of the sealed casing 242 is directed into the interior of the rotor housing 244 in impinging jet relation to the buckets 108 to impart rotary motion to the turbine 106 in a clockwise direction as viewed in FIGURE 8.

The pressurized gaseous medium thus directed through the passages 160 and 162 in impinging relation to the buckets 108 serve to drive the turbine 106 within the rotor housing 244. The jets of pressurized impinging gaseous medium are in turn exhausted into the cavities 170 and 172 within the rotor housing 244 at opposite sides of the turbine 106, as shown in FIGURE 8. The cavities 170 and 172 are in turn connected through annular passages or channels 174 in the rotor housing 244 as shown in FIGURE 7, so that the pressurized gaseous medium exhausted into the interconnected cavities 170 and 172 may in turn be exhausted through the exhaust passage 252 provided in bearing 256 and opening from the cavity 170, as shown in FIGURE 8, to the atmosphere through the exhaust channel 117 in the casing 242, as shown in FIGURES 4 and 5.

There are further provided in the rotor housing 244 at opposite ends thereof, as shown in FIGURE 7, inlet passages or parts 182 and 184 through which the pressurized gaseous medium within the sealed casing 242 may be directed into the interior of the rotor housing 244 and at the opposite ends of the rotor or turbine member 106. Further, opening through the side of the housing 244 are ports 186 and 187 which serve to direct pressurized gaseous medium from within the casing 242 into annular channels 190 and 192 which in turn open through ports 194 and 196 into the interior of the rotor housing 244 so as to apply a layer of pressurized gaseous medium about the bearing surfaces of the turbine 106. Such gaseous medium under pressure is applied both to the turbine 106 at the bearing end surfaces thereof as well as to the annular side bearing surfaces of the turbine 106.

The turbine 106 is effectively floated then in a gas bearing within the rotor housing 244 provided by the pressurized gaseous medium applied through the ports 182, 184, 186, and 187. The pressurized gaseous medium forming the gas bearings at the ends of the turbine 106 are further exhausted through passages 200 and 202 into the annular channels 174 heretofore described.

Likewise the gaseous medium forming the gas bearing about the annular bearing surfaces of the turbine 106 exhausts into the channels 174 which in turn interconnect the cavities 170 and 172 and thereby exhaust through the passage 252 and exhaust passage 117 to the atmosphere, as heretofore explained.

The bearing 256, as shown in FIGURES 4 and 5, also floats in pressurized gas bearing 258 supplied by gaseous medium under pressure from the interior of the casing 242 and exhausted past the restriction 119 into the channel 117 and thereby to the atmosphere.

Figure 6:
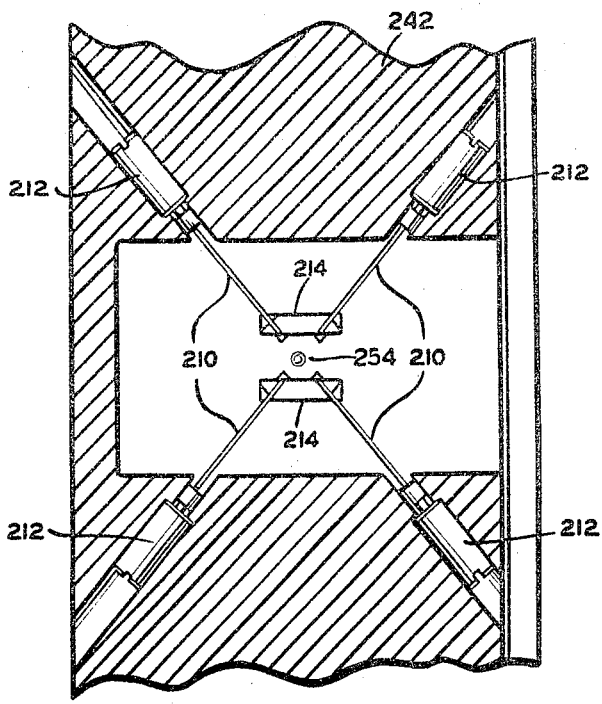
FIGURE 6 is a partial sectional view of FIGURE 4 taken along the lines 6—6.

Thus the bearing 256 end of the rotor housing 244 floats in the pressurized gas bearing 258 while the opposite end of the rotor housing 244, as shown in FIGURES 4 and 6, is supported by flexible cross spring members 210 secured by fastening members 212 mounted in the casing 242 and secured at the opposite end to projecting flange portions 214 carried by the rotor housing 244, so that between the flexible torsion bar 254 and the cross spring member 210 the rotor housing 244 is flexibly supported at one end thereof while the other end of housing 244 is mounted in the gas bearing 258 and supported from undesirable oscillatory motions by the diaphragm bellows assemblies 274 and 275 which serve to dampen such undesirable oscillatory motions.

*Proportional control valve*

Figures 11, 12:
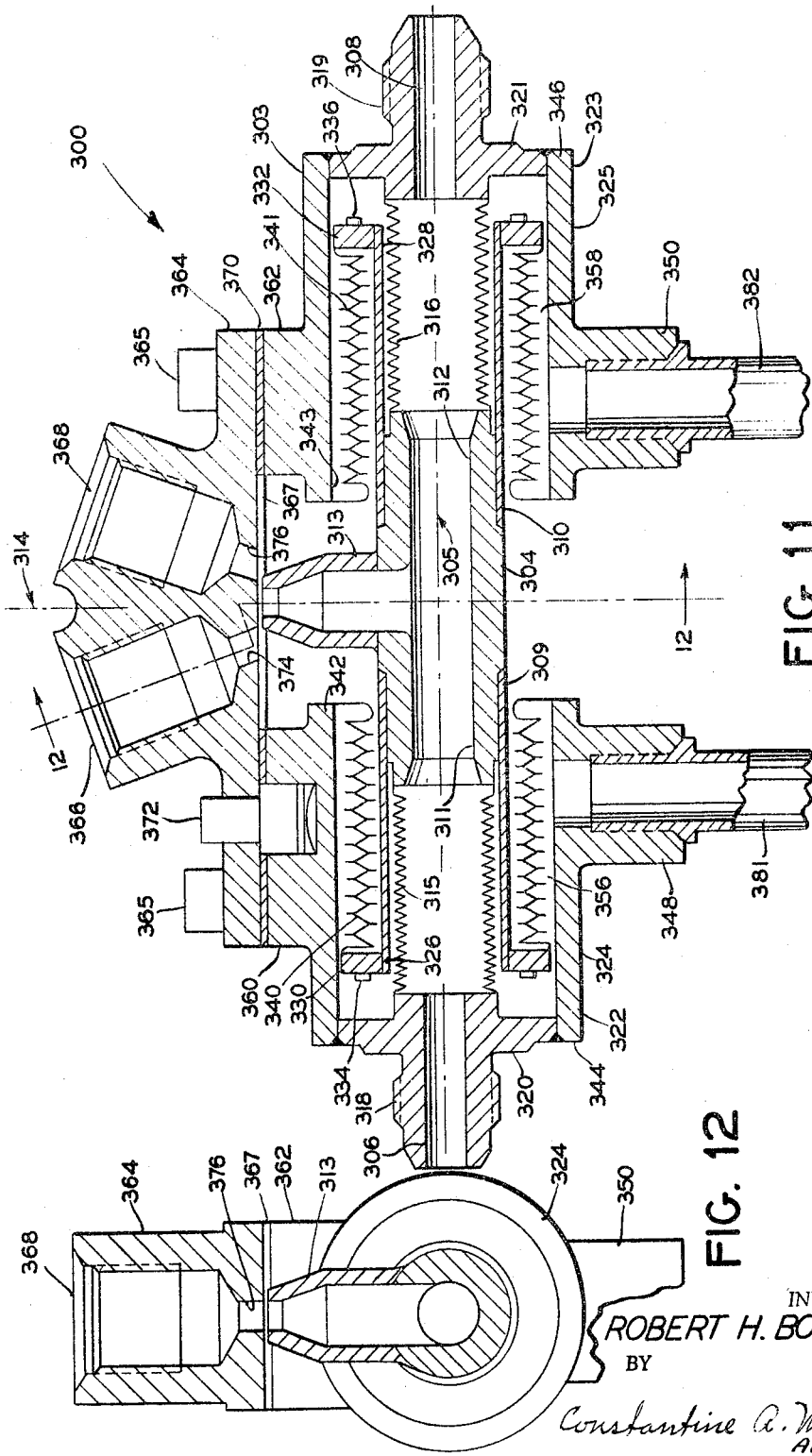
FIGURE 11 shows a side elevational view, in section, of the improved proportional control valve.
FIGURE 12 shows an end view, partly in section, taken along lines 12—12 of FIGURE 11, of the valve of FIGURE 11.

The invention claimed herein relates to the proportional control valve 300 in operative relation in the system of FIGURES 1 and 2 and to the control valve per se of FIGURES 11 and 12. Referring specifically to FIGURES 11 and 12, the proportional control valve 300 is shown comprising a housing 303 in which is supported a T type fitting 304 longitudinally movable along an axis of the valve 300. The housing 303, the T 304, and the overall valve assembly 300, have the same longitudinal axis 305. The axis 305 is aligned with the direction of supply of pressurized gas brought in through opposed inlet ports 306 and 308, at each end of the valve 300. As shown in FIGURES 1 and 2, the gas is supplied to the valve 300 from the fuel tank 10 by the line 28 past the three way selector valve 31, and through the position feedback assembly 301, as herein more fully described. The T fitting 304 has circular tubes 309 and 310 extending axially outwardly of its center line and secured to its leg portions 311 and 312 respectively. Midway of the T's length, extending outwardly of its longitudinal center is located a lateral outlet or gas nozzle 313 which is in fluid communication with the interior of both of the T's leg portions 311 and 312. The T 304 receives the supply gas pressure equally from each port 306 and 308 to thereby balance out any transverse force and directs it outwardly through its nozzle 313. That is, as viewed in FIGURE 11, the valve 300, with its components, is symmetrical about a vertical center line 314 which extends transverse to the axis 305. This provides a balance about the vertical center line 314 to reduce shifting of the T 304 due to uneven pressure or heating within the valve housing 303.

Connected to the end of the T's leg portions 311 and 312, within the inside diameter of the circular tubes 309 and 310, are located a pair of bellows 315 and 316. The other end of the bellows 315 and 316 are connected to externally threaded fittings 318 and 319 which have raised rims or flanges 320 and 321 connected, such as by welding, to axially outwardly extending end portions 322 and 323 of tubes 324 and 325 of the housing 303.

Secured circumferentially to axially outwardly extending ends 326 and 328 of the tubes 309 and 310 are circular rings 330 and 332 having annular bosses or stops 334 and 336. The stops 334 and 336, by contacting the inside surfaces of the flanges 320 and 321, limit the lateral travel of the T 304 with its nozzle 313 within the housing 303.

Surrounding the tubes 309 and 310, and connecting the outer periphery of the rings 330 and 332, are inwardly directed bellows 340 and 341. Bellows 340 and 341 each have one end attached to the rings 330 and 332 and the other end, the inwardly directed end, attached to inner end portions 342 and 343 of the tubes 324 and 325 of the housing 303.

It should be noted that the tubes 324 and 325 and the flanges 320 and 321 of the fittings 318 and 319 form opposed caps 344 and 346. The caps 344 and 346 have lateral outlets or fittings 348 and 350. The assembly of the caps 344 and 346, the fittings 318 and 319, the bellows 315 and 316 and the T 304 form a sealed container having the inlet ports 306 and 308 to receive the hot gas supply from the fuel tank 10 and to direct it through the lateral outlet or gas nozzle 313. The outlets 348 and 350 are positioned along the outer control portion of the bellows 340 and 341 for directing the differential pressure signals received from the control mechanism 54 through the position feedback assembly 301 through output lines or conduits 381 and 382, see FIGURES 2 and 11, into cavities 356 and 358 respectively of the valve 300. That is, the pressure applied in the chamber between the fluid pressure orifice 112 and the restricted orifice 116, shown in FIGURE 1, operates through conduit 120 to control a pressure applied to the position feedback assembly 301 of FIGURES 2 and 13 to produce a pressure directed through conduit 381 to the cavity 356 of the control valve 300 of FIGURE 11, and the pressure applied in the chamber between the fluid pressure orifice 114 and the restricted orifice 130, shown in FIGURE 1, operates through conduit 134 to control a pressure applied to the position feedback assembly 301 of FIGURES 2 and 13 to produce a pressure directed through conduit 382 to the cavity 358 of the control valve 300 of FIGURE 11. It should be noted here that the cavity 356 is formed by the tube 309, the bellows 340, the tube 324, the flange 320 and bellows 315. The cavity 358 is formed by the tube 310, the bellows 341, the tube 325, the flange 321, and the bellows 316.

At one central portion on the circumferential surfaces of the tubes 324 and 325, such as portions opposite the fittings 348 and 350, are attached bosses 360 and 362, securing by means of bolts 365, a receiver block 364 which bridges the bosses 360 and 362 for connecting together the two opposed caps 344 and 346. The receiver block 364 has two load pressure outlet ports 366 and 368 positioned adjacent to the nozzle 313 to receive the gas supply from within the valve 300. In cooperation with the clamping action of the bolts 365, there is provided shims 370 to adjust a gap 367 formed by the shims 370 between the nozzle 313 and the block 364. In addition, there is provided an eccentric adjustment bolt 372 between the block 364 and the cap 344 to adjust the null position of the valve 300. The null position results when the nozzle 313 is exactly midway between two receiver holes 374 and 376 of the outlet ports 366 and 368, respectively. The outlet ports 366 and 368 being connected to the valve motor 60 by conduits 369 and 371, see FIGURE 2, for driving the motor and mechanical transmission 65 in one direction or another, to position the aerodynamic surfaces, not shown, of the aircraft or outer space vehicle.

Feedback assembly

Referring now to FIGURE 13, together with FIGURES 1 and 2, it will be seen that the input signal and position feedback assembly 301, an all mechanical and pneumatic or fluid concept, performs the function of relating the actual transmission output position of the servo to the desired input signal. That is, the aerodynamic servo 60 includes the position feedback assembly 301 for directing the position error signal through conduits 381 and 382 to the servo valve 300, an amount proportional to the error signal.

The input signal and position feedback assembly 301 includes a flapper valve assembly 401 which comprises an inverted T shaped arm 402 having two nozzles 403 and 404 extending outwardly of a stem portion 405 to each end of each leg 406 and 407. The stem portion 405 is integral to a rectangular-circular torsion bar 408 which physically suspends the arm 402 with the nozzles 403 and 404, as shown in FIGURE 13. The nozzles 403 and 404 therefore can pivot about a longitudinal central axis 409 of the torsion bar 408 due to the torsional rotation of the torsion bar 408 induced by an amount proportional to the error signal, as herein more fully described.

The suspended nozzles 403 and 404 are located a distance 410 longitudinally from a fixed end portion 411 of the torsion bar 408. The point of zero torsional rotation 412 of the torsion bar 408 may be varied by use of an adjustable clamp 413 which can be moved longitudinally along the rectangular portion of the torsion bar 408 to change the effective length of the torsion bar 408 and thereby change the length between the point of zero torsional rotation 412 of the torsion bar 408 and the nozzles 403 and 404. By this method, the arc length of travel of the nozzles 403 and 404 about its pivot or central axis 409 can be adjusted.

As shown in FIGURE 13, the torsion bar 408 is machined internally to accept supply gas through its fixed end portion 411 by a conduit 420. That is, the supply gas flows through the three-way selector valve 31, through the conduit 420 and into the feedback assembly 301 at the fixed end portion 411 of the torsion bar 408.

Signal bellows 421 and 422 are positioned on each side of a flapper yoke 424 for receiving the differential pressure signals applied through output lines 120 and 134 from the control mechanism 54 to pivot the yoke 424 about its axis of rotation 426. Depending on the signals received from the mechanism 54, the position feedback assembly 301 effectively controls the valve 300 through conduits 381 and 382. That is, the movement of the flapper yoke 424 about its axis of rotation 426 presets the system proper close loop operation.

More specifically, as shown schematically in FIGURE 13, the torsion bar 408 of the position feedback assembly 301, mounted for torsional rotation about zero torsional rotation point 412, may be adjustably positioned in a suitable manner by the clamp 413 to provide various selected amplitude of arcuate movements of the nozzles 403 and 404 relative to the yoke 424. That is, the torsion bar 408 is adjustably positioned about point 412 so as to control the position of the nozzle 403 relative to one side 434 of the flapper yoke 424 and the nozzle 404 relative to a side 435 of the flapper yoke 424, to cause a pressure change to occur in the chambers 427 and 428 between a restricted orifice 431 and nozzle 403 and a restricted orifice 432 and nozzle 404 respectively. The pressure change within chambers 427 and 428 of FIGURE 13 are applied through conduits 381 and 382 to the fittings 348 and 350 of the proportional control valve 300 of FIGURE 11.

Referring to FIGURES 1 and 2, the change in the differential pressure applied in the chamber between valve orifice 112 and the restricted orifice 116 is applied through the conduit 120 to the bellows 422 of FIGURE 13. The change in the differential pressure applied in the chamber between valve orifice 114 and the restricted orifice 130 is, in turn, applied through the conduit 134 to the signal bellows 421. The differential pressure between bellows 421 and 422 position the flapper yoke 424 relative to the nozzles 403 and 404. The movement of the flapper yoke 424 relative to the nozzles 403 and 404 creates spacing between sides 434 and 435 and the nozzles 403 and 404. The controlled movement of the yoke 424 relative to the orifice 403 and 404 would, therefore, effect, in an opposite sense, a pressure change in the chambers 427 and 428.

With equal spacing between the nozzles and sides of the yoke, equal pressure would be produced in the conduits 381 and 382. Rotation of the arm 402 about axis 409 will cause unequal spacing to exist between the nozzles 403 and 404 and the sides 434 and 435 of the yoke 424. The side having the smallest gap creates the highest restriction to flow between the supply pressure entering from conduit 420 and the branched out pressure received by the conduits 381 and 382. That is, the side having the smallest spacing creates a higher pressure in its associated conduit.

A differential pressure therefore exists in conduits 381 and 382 which is directed to the valve 300 to produce a differential pressure within the valve 300 and therefore cause a longitudinal movement of the nozzle 313 within the valve 300. The longitudinal movement of the nozzle 313 will permit transmission of supply pressure reecived by valve 300 by its inlet ports 306 and 308, through the supply conduit 420 to be directed by its nozzle 313 to either outlet port 366 or 368. This supply pressure will then be conveyed by conduits 369 and 371 to the rotary expansion vane motor 64 which will rotate in the direction of the highest pressure supply. The harmonic drive 65 will then be driven by the motor 64 and will, in turn, drive the torsion bar 408 through gears 69 and 68. The torsion bars then will twist about axis 409 to rotate the arm 402 to its null position, thereby cancelling the initial error signal generated in conduits 381 and 382 thereby providing a close loop adjustment in the system.

Referring again to the drawings of FIGURES 1, 2, 11, and 13, the operation of the hot gas system, in conjunction with the proportional control valve 300 and the input signal and positioning feedback assembly 301, is as follows. The source of high temperature gas, at approximately 1400° F. and 600 p.s.i.g. is brought from the fuel tank 10 through the system into the position feedback assembly 301 and into the proportional control valve 300 through conduit 420 with the control pressure signals applied through the output lines 120 and 134 of the control mechanism 54 to the position feedback assembly 301 to effectively control the valve 300 as herein described to position the aerodynamic surfaces. The supply pressure is brought into the valve 300 through the ports 306 and 308.

In the operation of the valve 300 when the nozzle 313 is in the null position, the pressurized gas will enter both ports 306 and 308 and will be directed equally by the nozzle 313 to outlet ports 366 and 368. That is, since the bellows 315 and 316, and the T 304 are symmetrical about center line 314 and since the components of the valve 300 have equal effective areas, they are subjected to the same internal pressure from the gas entering ports 306 and 308 and therefore no axial movement of the T 304 with the nozzle 313 takes place. All forces are balanced and the outlet ports 366 and 368 receive equal pressures. The pressure supply gas is then directed equally to the motor 64 through the conduits 369 and 371. The motor 64 receiving the pressure equally from the conduits 369 and 371 will not move to effect the aerodynamic control surfaces.

If a differential pressure signal is introduced from the control mechanism through the system past the position feedback assembly 301, into the valve 300 through the fittings 348 and 350 into the cavities 356 and 358, it will create an unbalance force. For example, if the pressure level received inside cavity 356 is 300 p.s.i.g., and the pressure level received inside cavity 358 is 150 p.s.i.g., the pressure difference will create an unbalance force directly proportional to the pressure differential. This will cause the T 304 with its nozzle 313 to move axially to the right as viewed from FIGURE 11. The T 304 connected to the tubes 309 and 310 will move to position the nozzle 313 towards the right so that more pressure and flow is received from the right receiver hole 376 than from the left receiver hole 374. The motor 64 will then receive more pressure gas from the conduit 371 to move the aerodynamic control surfaces in one direction. Similarly, a differential pressure of the opposite magnitude produces motion of the T 304 to the left of the null position. This will provide more pressure gas from the conduit 369 to the motor 64 to move the aerodynamic control surfaces in the other direction. It should be noted again that the null position results when the nozzle 313 is exactly midway between the two receiver holes. The null position is critical and can be adjusted by loosening the bolts 365 and shifting the receiver block 364 by the eccentric adjustment bolt 372. The end clearance or gap 367 between the nozzle 313 and the receiver block 364 can be controlled by the shimming 370. As outlined, the aerodynamic surfaces, not shown, can be moved by the motor 64 through the transmission 65 by directing differential pressure within the valve 300.

In summary, the valve 300, as constructed, provides for the use of differential pressure as a control source to feed pressurized gas to a vane to move the aerodynamic surfaces.

It should be noted that one feature of this invention is to have the bellows 340 and 341 interposed, for support, between the tubes 309 and 310 and the tubes 324 and 325, respectively. This places the bellows 340 and 341 only in axial motion upon the lateral movement of the nozzle 313. Thereby, both sets of bellows 315 and 316, and 340 and 341 are placed only in axial motion upon the lateral movement of the nozzle 313. This overcomes early failure which arises when the bellows are subjected to dual motion, thus enducing squirming.

It should be also noted again that the valve 300 is symmetrical about its transverse center line 314 whereby balance is preserved about this center line to reduce null shift due to uneven heating or pressure supply. In addition, it should be noted that since the bellows 315 and 316 have signal pressure applied on the outside, any signal pressure to the valve tends to reduce the stress on these bellows induced by the internal supply pressures. The balance produced by utilizing the signal pressure outside of the bellows to counteract the supply pressure inside of the bellows also protects the bellows against early failure.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a fluid pressure operated network signal amplification system having a source of fluid pressure supply and a fluid pressure controlling signal, comprising means for controlling an attitude of the vehicle, a rate gyroscope carried by said vehicle and operable by said fluid pressure supply, means operatively connecting the rate gyroscope to the attitude control means for symmetrically supplying pressure to said attitude control means, said attitude control means further comprising a valve housing having a first opening means for symmetrically receiving the supply pressure, a second opening means for receiving differential signal pressures from the network, floating means symmetrical to and longitudinally movable within said housing operable for longitudinal movement depending on the differential pressure received for directing the supply pressure through the housing, bellows connecting said housing to said floating means operably permitting longitudinal movement of said floating means and whereby said supply pressure is compensated by said signal pressure for reducing the strain on said bellows.

2. In a fluid pressure operated network signal amplification system for controlling the attitude of a vehicle and operable to supply controlling fluid pressure signals and having a fluid pressure supply, said system comprising a rate gyroscope carried by said vehicle, an attitude control means, means operatively connecting the rate gyroscope to said attitude control means, said connecting means including a signal transmitting lever, a pair of balanced pressure transmitting bellows operatively connected to the signal transmitting lever, diaphragm means sensitive to fluid pressure output signals from the rate gyroscope and operatively associated with each bellows, a capillary tube operatively connecting each of said bellows to a constant fluid pressure source so as to render ineffective fluid pressure output signals from said rate gyroscope of a low frequency range and transmitted to each of said bellows by said signal sensitive diaphragm means, a flapper valve means operatively associated with the attitude control means for the vehicle, means operatively connecting said signal transmitting lever to said flapper valve means and so arranged as to effectively attenuate the fluid pressure output signals from the rate gyroscope of an extremely high frequency range caused by the structural coupling between the vehicle and the rate gyroscope coupling carried thereby, said signal transmitting lever being operatively associated with said flapper valve means so as to provide a high gain in fluid pressure output signals from said rate gyroscope over a frequency range intermediate said low frequency range and said extremely high frequency range; the improvement comprising a proportional control valve operable to receive the high gain output fluid pressure signals, said valve further comprising inlet ports for receiving fluid pressure from the fluid pressure supply of said network, other ports operable to receive the high gain fluid pressure output signals from said rate gyroscope, outlet ports operable to direct the fluid supply pressure outwardly of said valve, means operated by said high gain fluid pressure signals and movable relative to the outlet ports for supplying to one or the other outlet ports the fluid supply pressure depending on the high gain fluid pressure signals, and bellows operable by said high gain fluid pressure signals for controlling the movement of said movable means.

References Cited by the Examiner
UNITED STATES PATENTS

| | | | |
|---|---|---|---|
| 2,104,627 | 1/1938 | Von Manteuffel | 244—78 |
| 2,693,921 | 11/1954 | McKissack et al. | 244—78 |
| 3,071,337 | 1/1963 | Harcum | 244—78 |
| 3,180,592 | 4/1965 | Jeye et al. | 244—78 |

References Cited by the Applicant
UNITED STATES PATENTS

| | | |
|---|---|---|
| 2,613,687 | 10/1952 | Wiegand et al. |
| 2,645,240 | 7/1953 | Drake. |
| 2,853,091 | 9/1958 | Tuer. |
| 2,940,461 | 6/1960 | Binford. |
| 3,047,003 | 7/1962 | Gurney. |

MILTON BUCHLER, *Primary Examiner.*

ANDREW H. FARRELL, *Examiner.*